United States Patent [19]

Tatematsu et al.

[11] Patent Number: 5,553,464
[45] Date of Patent: Sep. 10, 1996

[54] AUGER TYPE ICE MAKING MACHINE

[75] Inventors: Susumu Tatematsu, Nagoya; Kazuhiro Mori, Toyoake; Hideyuki Ikari, Kariya, all of Japan

[73] Assignee: Hoshizaki Denki Kabushiki Kaisha, Toyoaki, Japan

[21] Appl. No.: 352,181

[22] Filed: Dec. 1, 1994

[30] Foreign Application Priority Data

Dec. 6, 1993 [JP] Japan ................... 5-065048

[51] Int. Cl.⁶ ................................. F25C 5/12
[52] U.S. Cl. ........................ 62/354; 384/299
[58] Field of Search ................. 62/354; 384/299, 384/300

[56] References Cited

U.S. PATENT DOCUMENTS

| | | | |
|---|---|---|---|
| 2,675,283 | 4/1954 | Thomson | 384/299 |
| 3,070,408 | 12/1962 | Reuter | 384/300 |
| 3,236,573 | 2/1966 | Donnellan | 384/299 |
| 3,502,380 | 3/1970 | Adinoff | 384/299 |
| 4,308,938 | 1/1982 | Denton | 384/300 X |
| 4,802,430 | 2/1989 | Kramer | 384/300 X |
| 5,417,499 | 5/1995 | Jacques et al. | 384/300 X |

*Primary Examiner*—William E. Tapolcai
*Attorney, Agent, or Firm*—Wenderoth, Lind & Ponack

[57] ABSTRACT

An auger type ice making machine according to the present invention comprises a refrigeration casing 11 around which a refrigerant evaporation pipe 13 is wound, an auger 17 rotatably disposed in said refrigeration casing and having a blade 17b formed thereto, and a press head 27 fixed to the inside of the refrigeration casing at the upper end thereof and having an ice compression passage formed in an axial direction. A high-hardness metal layer 35 composed of a self-melting metal is formed to the upper rotary shaft 17c of the auger 17 passing through the center hole 27c of the press head, a resin slide bearing 29 in contact with the metal layer 35 is fixed to the center hole of the press head in such a manner that the slide bearing 29 projects from the boundaries of the high-hardness metal layer at the both ends thereof and covers the entire surface of the metal layer 35, and the upper rotary shaft 17c of the auger 17 is supported by the press head 27 through the slide bearing 29.

5 Claims, 4 Drawing Sheets

FIG. 3A    FIG. 3B
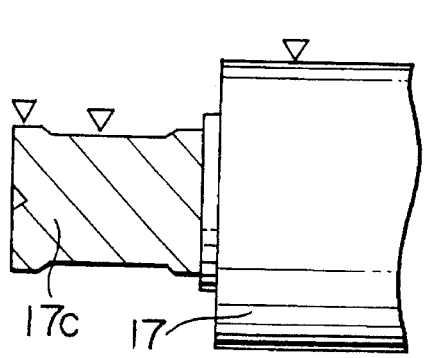 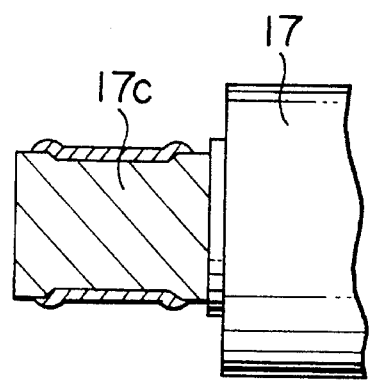
FIG. 3C    FIG. 3D
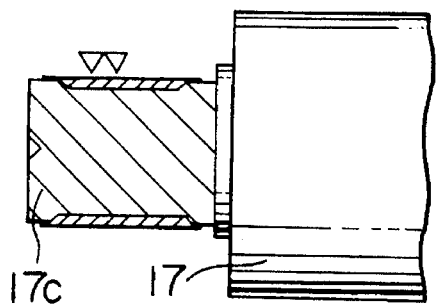 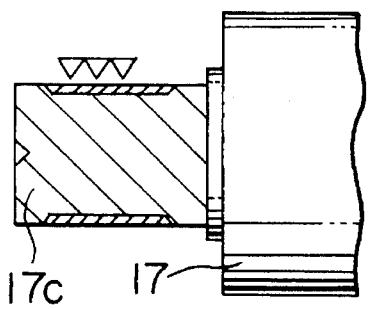
FIG. 4
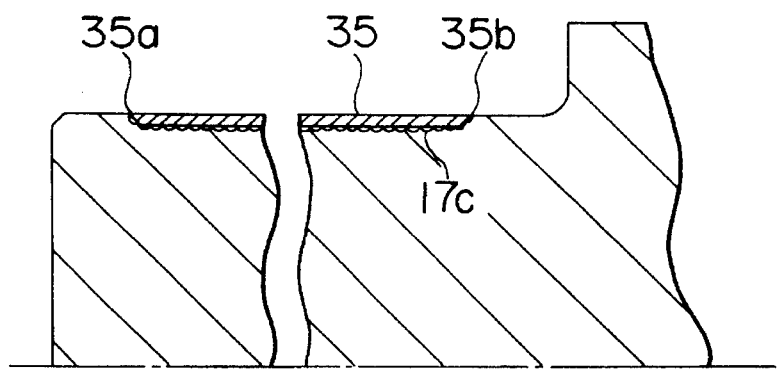

AUGER TYPE ICE MAKING MACHINE

BACKGROUND OF THE INVENTION

1. Field of the Invention

The present invention relates to an auger type ice making machine for scratching off an ice layer grown on the inner surface of a refrigeration casing which is cooled from the outside by a helical blade of an auger, compressing the scratched ice and discharging the same as ice particles.

2. Description of the Related Art

In an auger type ice making machine, although the upper rotary shaft of an auger rotating about a vertical axis is supported in a radial direction by a press head, a large force resulting from a reaction force produced when an ice layer is scratched off is applied to the auger in a downward direction. Further, since ice is pushed out through an ice compression passage passing though the press head, an upward force acts on the press head. Therefore, since there is a tendency that a gap between the upper shoulder surface of the auger and the lower end surface of the press head is increased, impurities are liable to enter the bearing portion of the upper rotary shaft. Further, impurities such as silica and the like in ice making water in the refrigeration casing tends to concentrate at the upper portion of the refrigeration casing on which the press head is disposed to compress and dehydrate sherbet like ice, by which the concentration of impurities is increased in the vicinity of the upper shoulder surface of the auger.

Therefore, the bearing unit of the upper rotary shaft of the auger which is supported by being inserted into the press head has many problems to be solved, to which many proposals have been made.

For example, according to the proposal of Japanese Patent Laid-Open No. 58-21020, a downward force applied to an auger is transmitted to a press head through a specially provided thrust bearing so that an upward force applied to the press head is canceled by the downward force. At the same time, a radial direction load applied to the auger is supported by a ball bearing and the auger is isolated from an ice making space by an oil seal with a lip. Although a problem caused by a thrust load is solved by the proposal, however, there remains a problem that the lip is liable to be damaged because sherbet like ice and foreign substances such as silica and the like are pressed against the oil seal, the ball bearing is damaged by the invasion of water and foreign substances and lubricant leaks.

According to the proposal of Japanese Utility Model Laid-Open No. 60-187887, a seal composed of a groove having a plurality of steps is formed to a gap between a space containing ice making water and a bearing unit to prevent the invasion of foreign substances such as silica and the like and sherbet like ice into the bearing unit. Since the seal refrigerates ice previously invades into the groove to thereby prevent the invasion of the foreign substances such as silica and the like, it is effective when operation is carried out for a considerable period of time. However, the effect for preventing the invasion of the foreign substances cannot be expected just after the start of operation.

According to the proposals of Japanese Utility Model Publications Nos. 61-32304 and 3-36858, although abnormal wear of a press head and the upper shoulder surface of an auger is prevented by an independent hard washer interposed between the press head and the upper shoulder surface of the auger, since a force acts as described above, a gap therebetween tends to increase and this arrangement does not much contribute to prevent the invasion of foreign substances to a bearing unit.

As described above, although there are proposals for independently cope with various problems of the bearing unit of the upper rotary shaft of an auger, none of them does not satisfactorily solve the problems as a whole.

Taking the above fact into consideration, the inventors of the present application have proposed a practically applicable structure using a slide bearing for low speed and high load, the structure being arranged such that a metal layer composed of high-hardness/high corrosion resistance metal is formed on the periphery of the upper rotary shaft of an auger. To explain this structure with reference to FIG. 5, an auger 2 in a refrigeration cylinder includes a helical blade 2a and an upper rotary shaft 2b is supported by a press head 3 through a high load resistant slide bearing 4. A high-hardness metal layer 2c of about 0.5 mm thick is formed to the periphery of the upper rotary shaft 2b. With this arrangement, the damage of the sliding surface of the bearing can be prevented by the combination of the slide bearing 4 and the high-hardness metal layer 2c even if impurities, foreign substances, water and the like invades into a bearing unit. Thus, its life is prolonged about five times longer than a usual one.

As described above, when the high-hardness metal layer is formed on the periphery of the upper rotary shaft of the auger, wear resistant characteristics are greatly improved. When the high-hardness metal layer is formed by thermal splaying, however, pinholes are sometimes formed and there is a possibility that unacceptable portions may be caused by the pinholes. The pinholes are liable to be made on the boundaries between a base metal and the metal layer. In practice, the occurrence of pinholes is prevented in such a manner that the ends of the metal layer is formed to an edge having acute angle on the boundaries between the ends of the metal layer and the base metal.

Consequently, cracks are liable to be produced to the metal layer when the metal layer is cut or ground so that it is subjected to finish machining. More specifically, in the conventional arrangement whose life is prolonged by forming the aforesaid high-hardness metal layer on the periphery of the upper rotary shaft of an auger, there is a problem that pinholes and cracks are liable to be produced at the end of the metal layer in the axial direction thereof in a manufacturing process and rust is produced from them.

SUMMARY OF THE INVENTION

An object of the present invention is to provide a auger type ice making machine having the bearing structure of the upper rotary shaft of an auger which is not damaged even if impurities such as silica and the like invades thereinto, having excellent wear resistance and from which rust is not proceeded even if pinholes and cracks are produced in the process of manufacture.

To achieve the above object, the auger type ice making machine according to the present invention comprises a refrigeration casing around which a refrigerant evaporation pipe is wound, an auger rotatably disposed in the refrigeration casing and having a helical blade formed on the outer periphery thereof, drive means for driving the auger in rotation, a press head fixed to the inside of the refrigeration casing at the upper end thereof as well as having a center hole through which the upper rotary shaft of the auger passes and an ice compression passage formed in an axial direction, a high-hardness metal layer formed on the peripheral surface of the upper rotary shaft of the auger, and a resin slide bearing fixed to the center hole of the press head and coming into contact with the high-hardness metal later in such a manner that the both ends of the slide bearing project from the boundaries of the high-hardness metal layer at the both ends thereof to cover the entire surface of the high-hardness metal layer.

The refrigeration casing and the ice making water contained therein are cooled by the evaporation heat of refrigerant passing though the refrigerant evaporation pipe and ice is produced on the inner surface of the refrigeration casing and grown, the ice is then scratched off by the helical blade of the auger in rotation and compressed and solidified while passing through the ice compression passage of the press head. A radial load applied to the upper rotary shaft of the auger is transmitted to the press head through the resin slide bearing. The resin slide bearing produces initial wear powder at the beginning of operation and the powder invades into the cracks and pinholes caused to the high-hardness metal layer and the boundaries thereof in manufacture and is filled with them. As a result, the powder prevents the contact of the base material of the upper rotary shaft with water and impurities to thereby prevent the occurrence of rust.

BRIEF DESCRIPTION OF THE DRAWINGS

FIGS. 3A–3D are views explaining the manufacturing processes of the main parts of the embodiment of FIG. 1, respectively;

FIG. 4 is a view explaining the main parts of the embodiment of FIG. 1; and

DETAILED DESCRIPTION OF PREFERRED EMBODIMENTS

A preferable embodiment of the present invention will be described below in detail with reference to the accompanying drawings, wherein the same numerals denote the same or corresponding parts.

Figure 1:
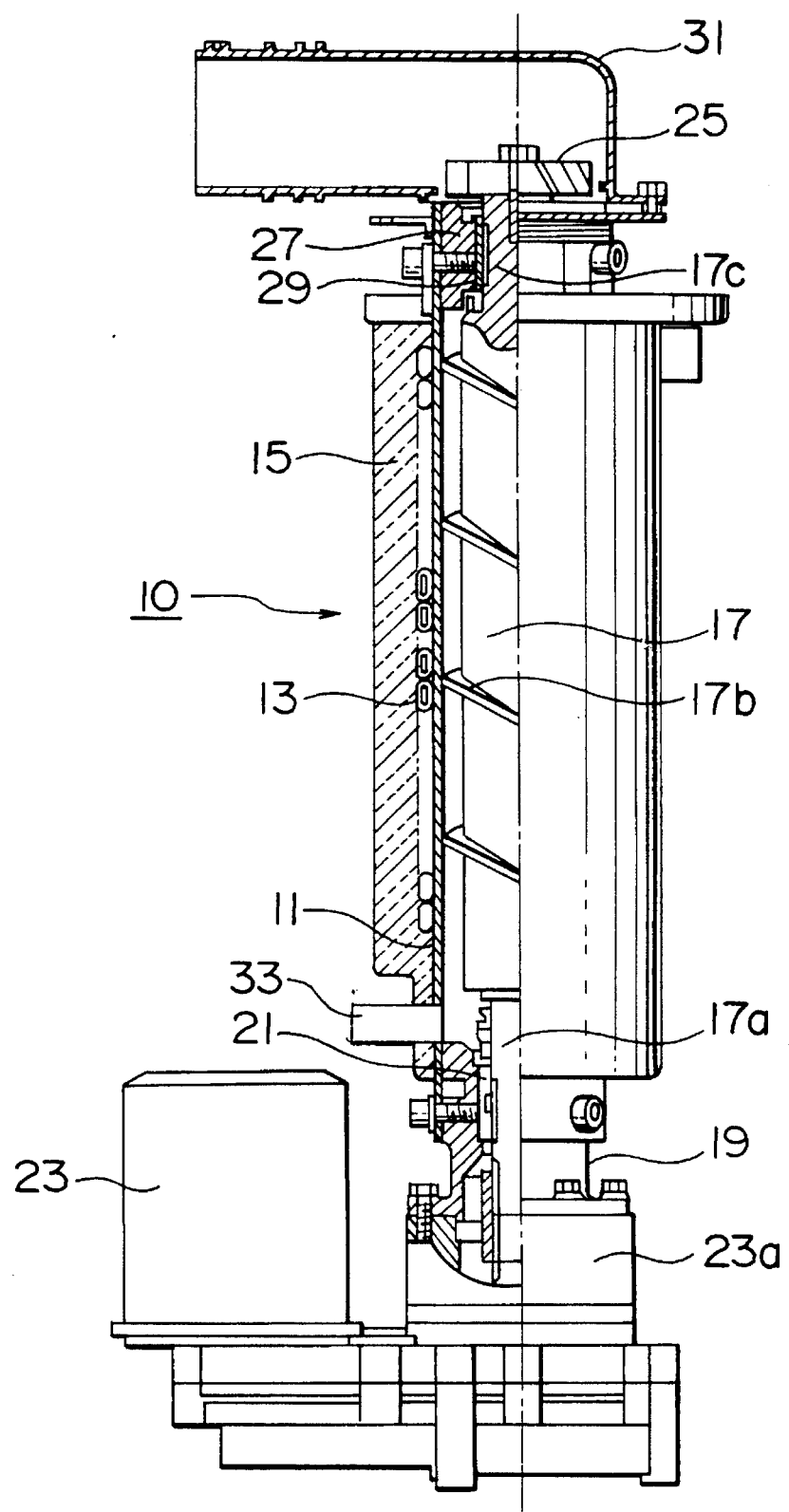
FIG. 1 is a cross sectional view showing the main structural portion of an auger type ice making machine according to an embodiment of the present invention.

FIG. 1 shows the main structural portion of an auger type ice making machine 10, wherein a refrigerant evaporation pipe 13 forming a part of a not shown refrigeration circuit is wound around the periphery of a refrigeration casing 11 and further the outside of the piping 13 is covered with a heat insulating material 15. The refrigeration casing 11 extends in a vertical direction, an auger 17 is coaxially and rotatably disposed in the refrigeration casing 11 and the lower rotary shaft 17a of the auger 17 is supported by a housing 19 through a slide bearing 21, the housing 19 being inserted into and secured to the inside of the refrigeration casing 11 at the lower end thereof. Further, the housing 19 is secured to the casing 23a of a driving geared motor 23 through flanged connection and the lower rotary shaft 17a is connected to the output shaft or the geared motor 23 through a coupling.

The auger 17 has a helical blade 17b confronting the inner surface of the refrigeration casing 11 through a narrow gap (e.g. about 0.5 mm). The auger 17 further has an upper rotary shaft 17c at the upper portion thereof to which a cutting blade 25 is fixed. A press head 27 fixed to the inside of the refrigeration casing 11 at the upper end thereof supports the upper rotary shaft 17c through a resin slide bearing 29. The refrigeration casing 11 further includes an ice discharge chute 31 fixed at the upper end thereof.

In the above arrangement, ice making water supplied into the refrigeration casing 11 through a water supply pipe 33 is cooled by the evaporation of the refrigerant flowing in the evaporation pipe 13 and frozen on the inner surface of the refrigerant casing 11 and grown to an ice layer. Since the auger 17 is rotated by the geared motor 23, it scratches off the grown ice and feeds it upward. The ice is compressed while it passes through an ice compression passage 27a formed in the press head 27 and dehydrated and solidified. When the solidified ice gets out above the press head 27, it is cut off to a predetermined size and made to ice particles by the cutting blade 25 and discharged to, for example, an ice storehouse (not shown) through the discharge chute 31.

Figure 2:
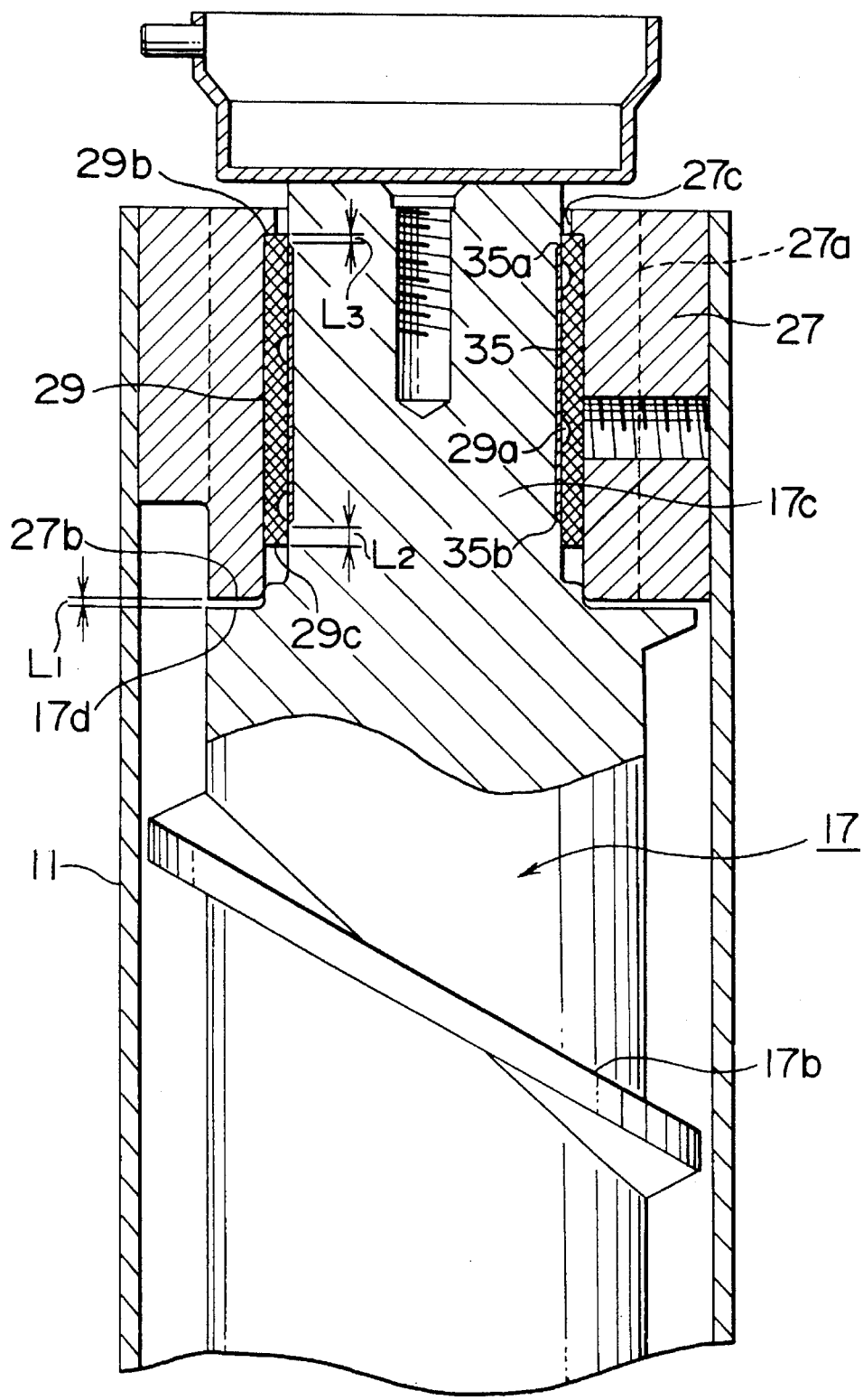
FIG. 2 is a partial cross sectional view showing the embodiment of FIG. 1 by enlarging the main structural portion thereof.
Figure 5:
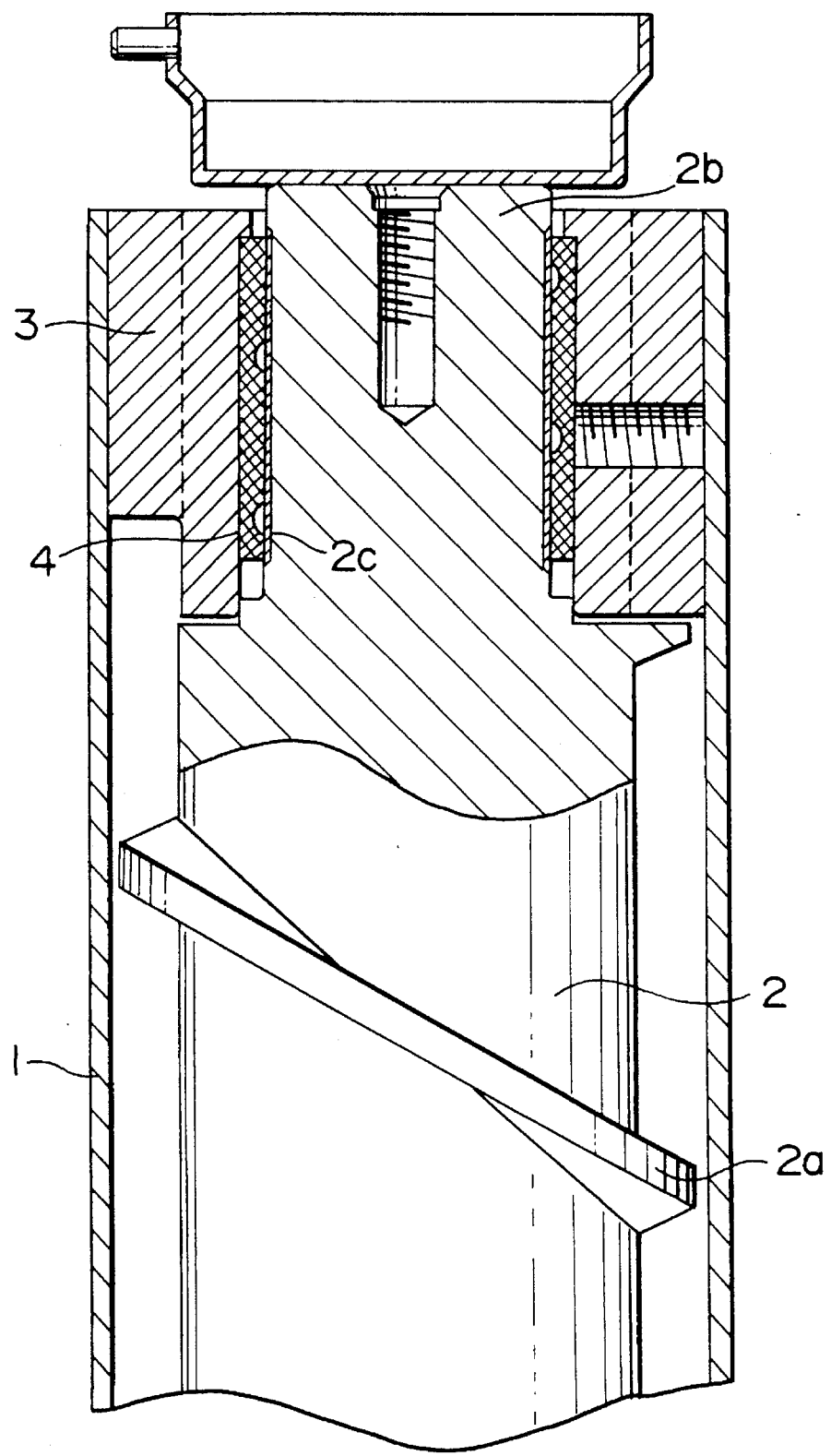
FIG. 5 is a partially cross sectional view partially showing the structure of conventional auger type ice making machine.

FIG. 2 shows the structures of the upper rotary shaft 17c of the auger 17, the press head 27 and the upper end of the refrigeration casing 11 in an enlarged scale. In FIG. 2, the press head 27 forms the ice compression passage 27a in association with the refrigeration casing 11 and the lower surface 27b of the press head 27 has a gap $L_1$ of about 1 mm formed between the upper shoulder surface 17d of the auger 17 and it, taking a tolerance in manufacture into consideration. A described above, the gap $L_1$ is increased to, for example, about 2 mm in operation because the auger 17 receives a downward thrust resulting from a reaction force produced when the auger 17 scratches off and feeds the ice. However, this dimension is of course merely one example and to be properly set taking the tolerance in manufacture into consideration.

The center hole 27c of the press head 27 has the resin slide bearing 29 fixed thereto. A suitable slide bearing may be used as the slide bearing 29. A lubricant groove 29a is formed to the inner surface of the slide bearing 29 so that lubricant (water in this embodiment) is caused to pass through the groove 29a.

In FIG. 2, a self-melting high-hardness metal layer (material mainly composed of nickel, material mixed with tungsten carbide, etc.) 35 made by the process or method to be described later is formed on the periphery of the upper rotary shaft 17c. The upper end 29b of the slide bearing 29 projects above the upper end 35a of the metal layer 35 and an amount the projection $L_3$ is set to satisfy the following formula E2. In the same way, the lower end 29c of the slide bearing 29 projects below the lower end 35b of the metal layer 35 and an amount of the projection $L_2$ is set to satisfy the following formula E1.

$$L_2 \geq L_1 + 2 + 0.5 \qquad \text{E1}$$

$$L_3 \geq L_1 + 0.5 \qquad \text{E2}$$

That is, the slide bearing 29 comes into contact with the metal layer 35 in such a manner that it always covers the entire surface of the metal later 35 from the upper end 35a to the lower end 35b thereof.

Next, the method of forming the metal layer 35 to the upper rotary shaft 17c of the auger 17 with reference to FIGS. 3A–3D. First, as shown in FIG. 3A, an undercut is formed to the periphery of the upper rotary shaft 17c of the material of the auger 17 by machining. Next, as shown in FIG. 3B, a metal layer is formed onto the outer surface of the undercut by thermal spraying. Further, as shown in FIG. 3C, finish cutting is effected to the outer surface of the metal layer, leaving an amount to be ground. Finally, the metal layer is ground and finished to a regulated dimension with a predetermined tolerance as shown in FIG. 3D.

FIG. 4 shows the finished metal later 35, wherein a sensitized layer is formed to the upper rotary shaft 17c (base material) which is a boundary region in the vicinity of the metal layer 35, the sensitized layer resulting from the precipitation of carbide to a grain boundary and the carburization from a spray material due to the thermal affect in the processing. Since the concentration of chromium is lowered in the sensitized layer and the grain boundary in the vicinity thereof, the corrosion resistance in these regions is liable to be deteriorated. The tendency of the deterioration is remarkable in the vicinity of the upper and lower ends 35a and 35b where the thickness of the sprayed metal layer 35 is small. Further, defects such as cracks and the like are liable to be caused in these portions in cutting and grinding processes. Further, it is difficult to completely prevent the occurrence of pinholes in the metal layers. Consequently, there is an increased possibility that defective portions, which cannot be or are difficult to be found by inspection, communicate with the sensitized layer in the vicinity of the upper and lower ends 35a and 35b where the thickness of the metal later 35 is reduced.

When the auger 17 made as described above is assembled, the resin slide bearing 29 comes into contact with the metal layer 35 in such a manner that it always covers the entire surface of the metal layer 35 from the upper end 25a to the lower end 35b thereof, as described above. Therefore, when the auger type ice making machine is put into operation, first, initial wear powder is produced from the slide bearing 29 and effectively filled with the defective portions such as remaining pinholes, cracks and the like of the metal layer 35. Since the these defective portions are filled with the wear powder as described above as well as the entire surface of the metal layer 35 always slides on the bearing 29, the occurrence of rust can be prevented which otherwise results from the adhesion of iron and the like in water to the metal layer 35. Thus, even if foreign substances such as powder of silica, calcium and the like precipitated from ice making water invades between the slide bearing 29 and the metal layer 35, it is discharged above the press head 27 through the groove 29a formed to the slide bearing 29 without entering the defective portions such as pinholes, cracks and the like.

As a result, corrosion and the like are not caused and progressed and the invasion of these foreign substances into ice can be also prevented.

What is claimed is:

1. An auger type ice making machine, comprising:

a refrigeration casing around which a refrigerant evaporation pipe is wound;

an auger rotatably disposed in said refrigeration casing and having a helical blade formed on the periphery thereof;

a press head fixed to the inside of said refrigeration casing at an upper end thereof, said press head having a center hole through which an upper rotary shaft of said auger passes and an axial ice compression passage;

drive means for driving said auger in rotation during which a force is imparted to said auger tending to move said auger axially relative to said press head;

a high-hardness metal layer fixedly formed on the periphery of said upper rotary shaft of said auger; and a resin slide bearing fixed to said press head within said center hole thereof and coming into contact with said high-hardness metal layer in such a manner that opposite ends of said slide bearing project from boundaries of said high-hardness metal layer at opposite ends thereof to cover the entire surface of said high-hardness metal layer.

2. An auger type ice making machine as claimed in claim 1, wherein an amount of projection $L_3$ (mm) of an upper end of said slide bearing from an upper end of said high-hardness metal layer satisfies $L_3 \leq L_1+0.5$, wherein a gap between a lower surface of said press head and an upper shoulder surface of said high-hardness metal layer is $L_1$ (mm).

3. An auger type ice making machine as claimed in claim 1, wherein an amount of projection $L_2$ (mm) of a lower end of said slide bearing from a lower end of said high-hardness metal layer satisfies $L_2 \leq L_1+2+0.5$, wherein a gap between a lower surface of said press head and an upper shoulder surface of said high-hardness metal layer is $L_1$ (mm).

4. An auger type ice making machine as claimed in claim 1, wherein said slide bearing has a groove for causing lubricant to pass therethrough.

5. An auger type ice making machine as claimed in claim 1, wherein said high-hardness metal layer is composed of a self-melting metal.

\* \* \* \* \*